United States Patent
Ryu et al.

(10) Patent No.: US 12,104,644 B2
(45) Date of Patent: Oct. 1, 2024

(54) FLOATING-SLEEVE HYBRID FLUID BEARING

(71) Applicant: INDUSTRY-UNIVERSITY COOPERATION FOUNDATION HANYANG UNIVERSITY ERICA CAMPUS, Ansan-si (KR)

(72) Inventors: Keun Ryu, Seoul (KR); Hyun Sung Jung, Seongnam-si (KR)

(73) Assignee: INDUSTRY-UNIVERSITY COOPERATION FOUNDATION HANYANG UNIVERSITY ERICA CAMPUS, Ansan-si (KR)

( * ) Notice: Subject to any disclaimer, the term of this patent is extended or adjusted under 35 U.S.C. 154(b) by 183 days.

(21) Appl. No.: 17/746,007

(22) Filed: May 17, 2022

(65) Prior Publication Data
US 2022/0275832 A1 Sep. 1, 2022

Related U.S. Application Data

(63) Continuation of application No. PCT/KR2020/016170, filed on Nov. 17, 2020.

(30) Foreign Application Priority Data

Nov. 18, 2019 (KR) .................. 10-2019-0148002
Nov. 17, 2020 (KR) .................. 10-2020-0153366

(51) Int. Cl.
*F16C 32/06* (2006.01)
*F16C 17/18* (2006.01)

(52) U.S. Cl.
CPC .......... *F16C 32/0633* (2013.01); *F16C 17/18* (2013.01); *F16C 32/0607* (2013.01); *F16C 32/0688* (2013.01)

(58) Field of Classification Search
CPC ........ F16C 17/02; F16C 17/024; F16C 17/18; F16C 32/0607; F16C 32/0633;
(Continued)

(56) References Cited

U.S. PATENT DOCUMENTS 5,634,723 A * 6/1997 Agrawal ............... F16C 17/024
384/106
6,155,720 A 12/2000 Bättig
(Continued)

FOREIGN PATENT DOCUMENTS

JP 11-2240 A 1/1999
JP 2003-336632 A 11/2003
(Continued)

OTHER PUBLICATIONS

Office Action dated May 25, 2022 from the Korean Intellectual Property Office in KR Application No. 10- 2020-0153366.
(Continued)

*Primary Examiner* — James Pilkington
(74) *Attorney, Agent, or Firm* — Sughrue Mion, PLLC (57) ABSTRACT

Provided is a floating-sleeve hybrid fluid bearing. The floating-sleeve hybrid fluid bearing may comprise: a bearing housing which is mounted by ring-coupling to the outer circumferential surface of a rotary shaft; and a floating sleeve which is mounted between the rotary shaft and the bearing housing so that there is a gap between the floating sleeve and the rotary shaft, and between the floating sleeve and the bearing housing, wherein the rotation of the floating sleeve is constrained by the bearing housing during the rotation of the rotary shaft, and one side of the floating sleeve in the circumferential direction is open in the radial direction.

9 Claims, 11 Drawing Sheets

(58) Field of Classification Search
CPC ............... F16C 32/064; F16C 32/0655; F16C 32/0659; F16C 32/0688; F16C 33/1065; F16C 2300/22
See application file for complete search history.

(56) References Cited

U.S. PATENT DOCUMENTS

| | | | |
|---|---|---|---|
| 7,494,282 B2* | 2/2009 | Lee | F16C 27/02 |
| | | | 384/106 |
| 9,719,556 B2* | 8/2017 | Kim | F16C 17/024 |
| 2011/0033142 A1 | 2/2011 | Kim et al. | |
| 2017/0051788 A1 | 2/2017 | Kim | |

FOREIGN PATENT DOCUMENTS

| | | | |
|---|---|---|---|
| JP | 2017-194117 A | | 10/2017 |
| KR | 10-0413060 B1 | | 12/2003 |
| KR | 10-2009-0075272 | * | 7/2009 |
| KR | 10-2010-0045253 A | | 5/2010 |
| KR | 10-2010-0095237 A | | 8/2010 |
| KR | 10-2018-0084634 A | | 7/2018 |
| KR | 10-2030175 B1 | | 10/2019 |

OTHER PUBLICATIONS

International Search Report for PCT/KR2020/016170 dated Feb. 22, 2021.

* cited by examiner

FLOATING-SLEEVE HYBRID FLUID BEARING

TECHNICAL FIELD

The present invention relates to a floating-sleeve hybrid fluid bearing, and more specifically, to a floating-sleeve hybrid fluid bearing for ensuring dynamic stability in a bearing system under extreme operating conditions such as high load, high vibration, high temperature, extremely low temperature, and bearing-shaft misalignment.

BACKGROUND ART

Recently, as the demand for high-speed rotating machines operable in extreme operating environments has increased in industries related to energy, propulsion and motive power, high-performance and high-efficiency fluid bearing technology is receiving great attention. This is because bearings occupy a very large proportion in development and operation of high-speed and high-efficiency turbines, compressors, and pump systems. In particular, external pressure bearings and foil bearings using working fluids as lubricants are currently receiving great interest in the field of fluid bearing technology, and lots of global companies have continuously invested in the development of products to which the above technology is applied.

The external pressure fluid bearing has advantages in that high-pressure fluid is supplied from the outside to a lubricating surface of the bearing to secure high load-bearing capacity and high rigidity and minimize friction and wear between shafts and bearings even in the absence of a relative motion.

However, the external pressure fluid bearing has a limitation of being easily damaged due to difficulty in securing a gap of the bearing under extreme operating conditions such as high load, high vibration, high temperature, extremely low temperature, and bearing-shaft misalignment.

Meanwhile, because the foil bearing has the improved rigidity and damping coefficient compared to general hydrodynamic bearings by applying a plurality of spring-damping elements (bump foil and top foil) inside a bearing sleeve, the foil bearing has been widely applied to small high-speed rotating machines recently.

However, since the foil bearing cannot have adequate load-bearing capacity when a rotary shaft is driven initially and stopped, continuous wear occurs on a bearing surface, and processes for design, manufacturing, and assembly are complicated.

DISCLOSURE

Technical Problem

One technical problem to be solved by the present invention is to provide the floating-sleeve hybrid fluid bearing for ensuring dynamic stability in a bearing system under extreme operating conditions such as high load, high vibration, high temperature, extremely low temperature, and bearing-shaft misalignment Another technical problem to be solved by the present invention is to provide a floating-sleeve hybrid fluid bearing capable of embodying and tuning the characteristics of the bearing suitable for needs of a user.

The technical problem to be solved by the present invention is not limited to the above description.

Technical Solution

In order to solve the above-mentioned technical problems, the present invention provides a floating-sleeve hybrid fluid bearing.

According to one embodiment, the floating-sleeve hybrid fluid bearing includes: a bearing housing mounted in a ring-coupled manner to an outer circumferential surface of a rotary shaft; and a floating sleeve mounted between the rotary shaft and the bearing housing so as to have a gap between the rotary shaft and the bearing housing, in which rotation is constrained by the bearing housing during the rotation of the rotary shaft, and one side of the floating sleeve in a circumferential direction is opened in a radial direction.

According to one embodiment, the bearing housing may include: a housing body having a center opened in an axial direction to allow the rotary shaft to be inserted; and at least one guide groove formed on an inner diameter surface of the housing body, formed in a depth direction from the inner diameter surface of the housing body, and variably coming into contact with an outer side of the floating sleeve according to the rotational direction of the rotary shaft.

According to one embodiment, the floating sleeve may include: a sleeve body having a center opened in the axial direction to allow the rotary shaft to be inserted, and having an outer diameter smaller than an inner diameter of the housing body; an opening formed on one side of the sleeve body in the circumferential direction, and formed to communicate between an inside and an outside of the sleeve body in the radial direction; and at least one protrusion formed on the outer diameter surface of the sleeve body, protruding radially outward from the outer diameter surface of the sleeve body, and accommodated in the guide groove.

According to one embodiment, when the protrusion is accommodated in the guide groove, the inner surface of the guide groove and the outer surface of the protrusion may have a clearance therebetween, and the protrusion portion may have a relative position changed within the guide groove according to the rotational direction of the rotary shaft.

According to one embodiment, the floating sleeve may include: a pocket formed in a depth direction at a position corresponding to the protrusion among the inner diameter surfaces of the sleeve body; a fitting mount hole provided on one side in the axial direction of the protrusion, and mounted therein with a fitting for connection with an external fluid supply device; a flow path formed to be connected inside the sleeve body and the protrusion to communicate the fitting mount hole with the pocket; and an orifice formed at an end of the flow path positioned on the pocket.

According to one embodiment, the orifice may be formed perpendicular or inclined with respect to the rotary shaft.

According to one embodiment, the present invention further includes a squeeze film damper, and the squeeze film damper may be provided in a gap between the bearing housing and the floating sleeve, and provided as a fluid lubricating layer having at least one layer.

According to another embodiment, the present invention further includes a compliant spring damper, and the compliant spring damper may be provided in a gap between the bearing housing and the floating sleeve, and provided as a bump foil having at least one ply.

According to another embodiment, the compliant spring damper may include a gap control foil provided in a longitudinal direction of the bump foil on both sides of a gap between the bearing housing and the floating sleeve in the width direction.

According to another embodiment, the bearing housing may further include at least one a slot formed on an inner diameter surface of the housing body, formed in a depth direction from the inner diameter surface of the housing body, and one end of the bump foil or the gap control foil in the longitudinal direction is inserted thereto.

According to the embodiment of the present invention, the floating-sleeve hybrid fluid bearing includes: a bearing housing mounted in a ring-coupled manner to an outer circumferential surface of a rotary shaft; and a floating sleeve mounted between the rotary shaft and the bearing housing so as to have a gap between the rotary shaft and the bearing housing, in which rotation is constrained by the bearing housing during the rotation of the rotary shaft, and one side of the floating sleeve in a circumferential direction is opened in a radial direction.

Advantageous Effects

Therefore, a bearing gap is actively changed under extreme operating conditions such as high load, high vibration, high temperature, extremely low temperature, and bearing-shaft misalignment, thereby avoiding or delaying pneumatic hammer instability, so that the stability of the bearing system can be remarkably improved, and the driving range thereof can be expanded.

In addition, The embodiment of the present invention may provide the floating-sleeve hybrid fluid bearing having the very excellent damping ability, so that dynamic stability in a bearing system can be secured under extreme operating conditions such as high load, high vibration, high temperature, extremely low temperature, and bearing-shaft misalignment.

In addition, the embodiment of the present invention may provide the floating-sleeve hybrid fluid bearing that can be rotatable in both directions while having a simple structure.

In addition, the embodiment of the present invention may provide the floating-sleeve hybrid fluid bearing that can be used as both of a hydrostatic bearing or a hydrodynamic bearing according to the rotational speed and the operating condition.

In addition, the embodiment of the present invention may provide the floating-sleeve hybrid fluid bearing that has a simple combined structure of the bearing housing and the floating sleeve, so that processing and assembling can be facilitated and maintenance can be easily performed.

In addition, the embodiment of the present invention may provide the floating-sleeve hybrid fluid bearing that the rigidity and damping of the compliant spring damper inserted and fixed between the bearing housing and the floating sleeve are adjusted, so that the bearing characteristics can be implemented and tuned to be suitable for needs of the user.

The floating-sleeve hybrid fluid bearing according to the embodiments of the present invention can be used as a replacement for bearings in existing turbine/compressor/pump systems.

MODE FOR INVENTION

Hereinafter, exemplary embodiments of the present invention will be described in detail with reference to the accompanying drawings. However, the technical idea of the present invention is not limited to the embodiments described herein, but may be realized in different forms. The embodiments introduced herein are provided to sufficiently deliver the idea of the present invention to those skilled in the art so that the disclosed contents may become thorough and complete.

When it is mentioned in the present disclosure that one element is on another element, it means that one element may be directly formed on another element, or a third element may be interposed between one element and another element. Further, in the drawings, thicknesses of films and areas are exaggerated for efficient description of the technical contents.

In addition, in the various embodiments of the present disclosure, the terms such as first, second, and third are used to describe various elements, but the elements are not limited to the terms. The terms are used only to distinguish one element from another element. Therefore, an element mentioned as a first element in one embodiment may be mentioned as a second element in another embodiment. The embodiments described and illustrated herein include their complementary embodiments. Further, the term "and/or" used herein is used to include at least one of the elements enumerated before and after the term.

As used herein, the terms of a singular form may include plural forms unless the context clearly indicates otherwise. Further, the terms such as "including" and "having" are used to designate the presence of features, numbers, steps, elements, or combinations thereof described in the present disclosure, and shall not be construed to preclude any possibility of the presence or addition of one or more other features, numbers, steps, elements, or combinations thereof.

Further, in the following description of the present invention, detailed descriptions of known functions and configurations incorporated herein will be omitted when they may make the subject matter of the present invention unnecessarily unclear.

Figure 1:
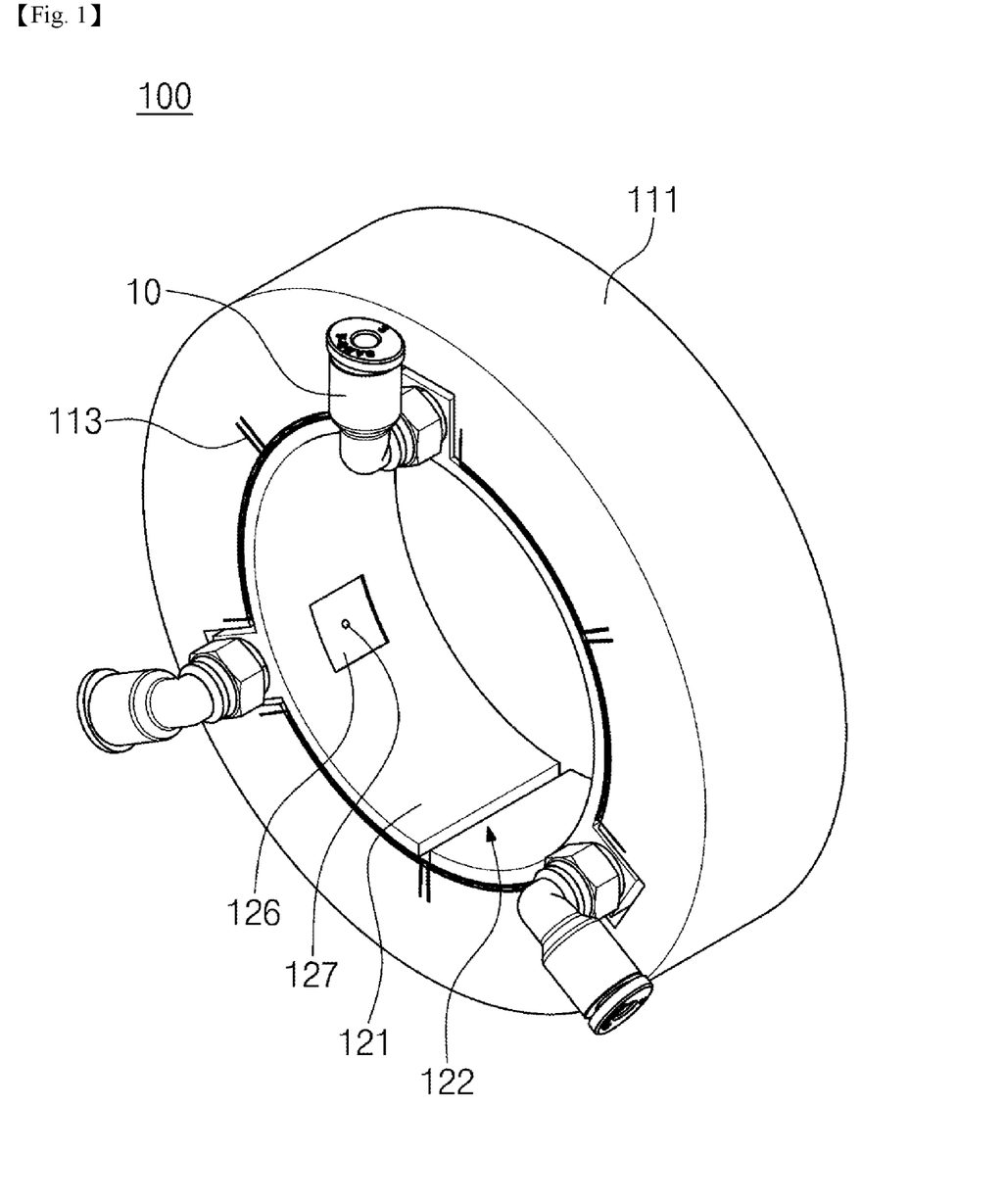
FIG. 1 is a perspective view showing a floating-sleeve hybrid fluid bearing according to one embodiment of the present invention.
Figure 2:
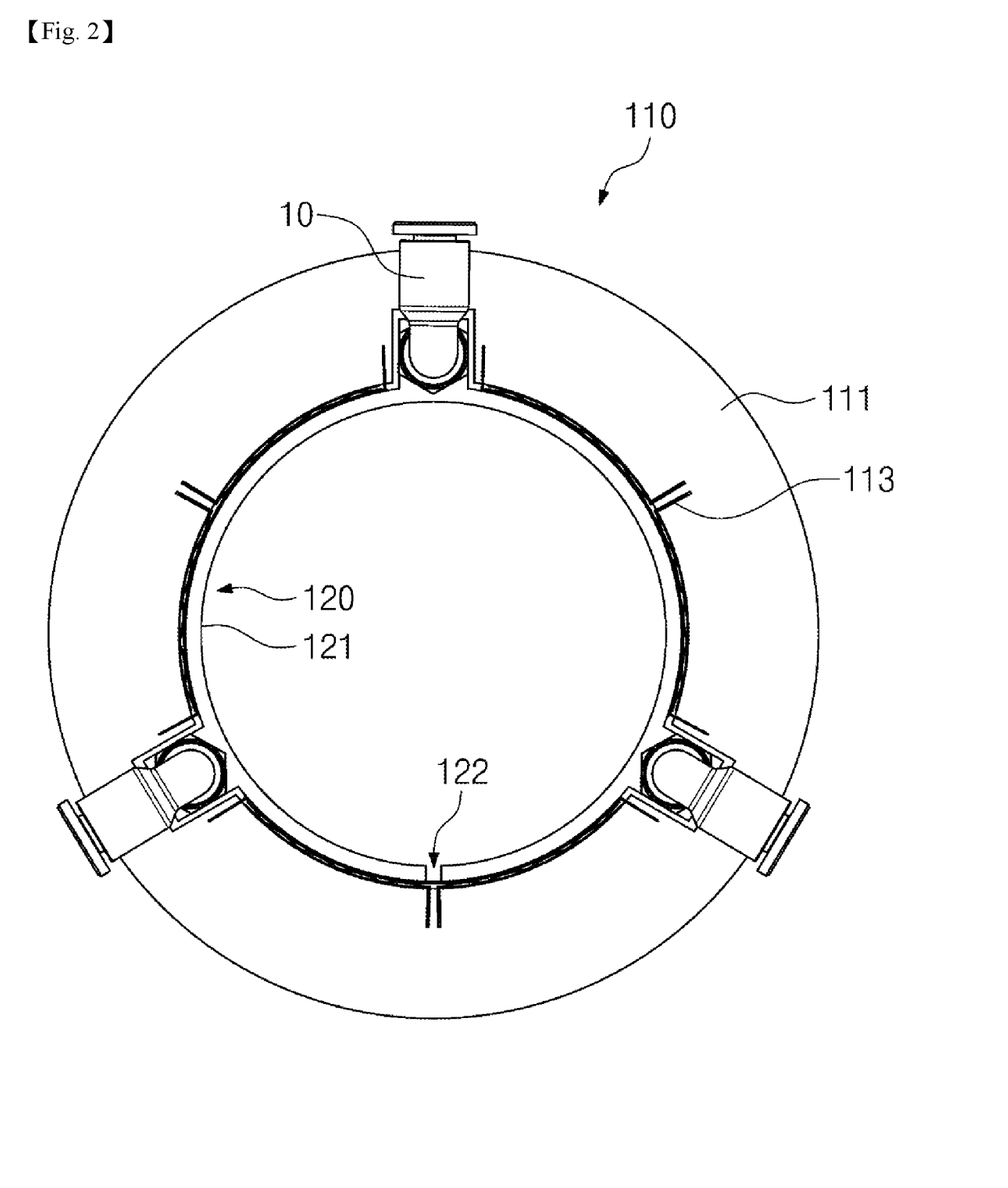
FIG. 2 is a plan view of FIG. 1.
Figure 3:
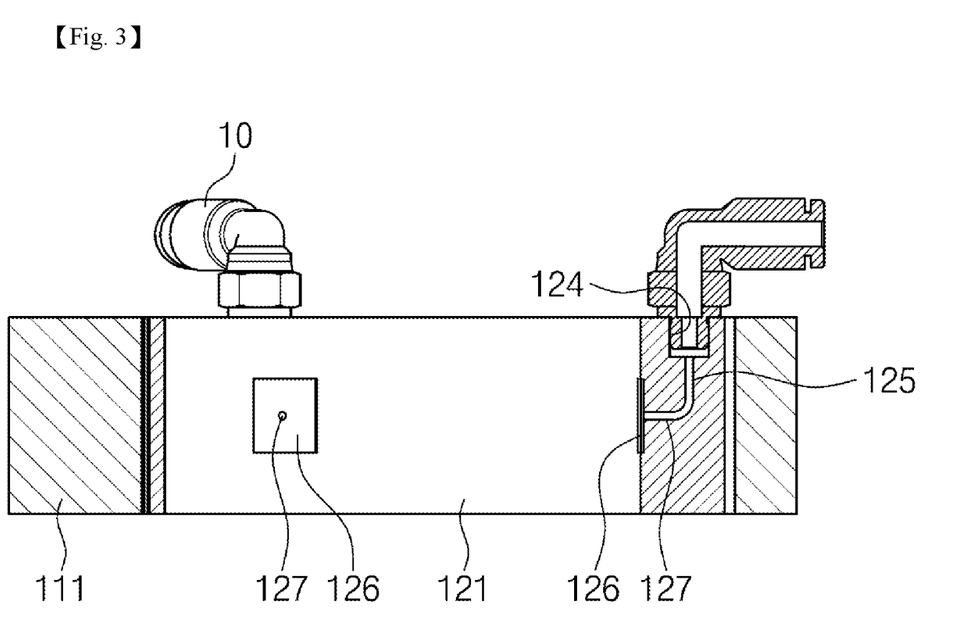
FIG. 3 is an incised sectional perspective view of FIG. 1.
Figure 4:
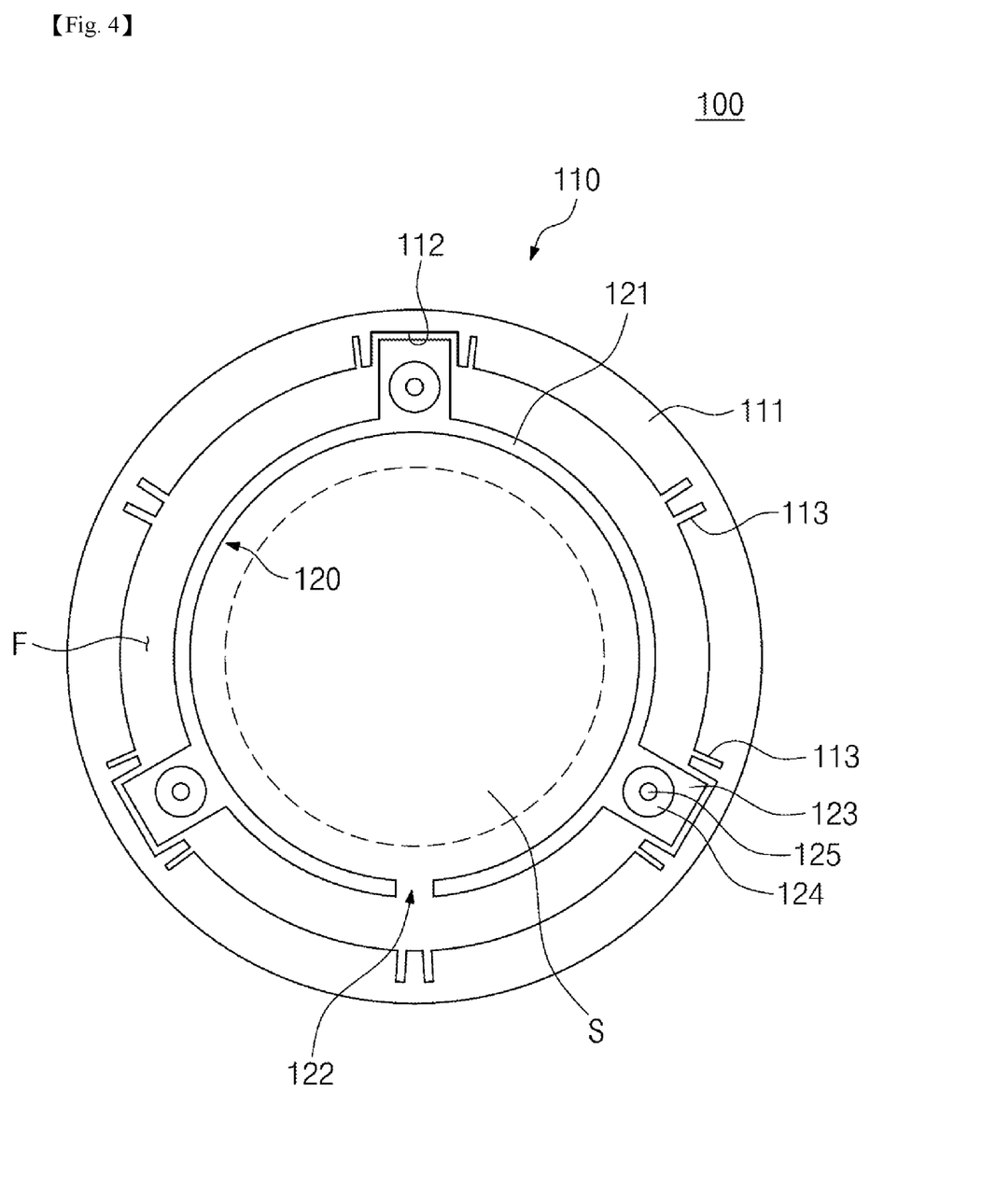
FIG. 4 is a schematic view showing the floating-sleeve hybrid fluid bearing according to one embodiment of the present invention.
Figure 5:
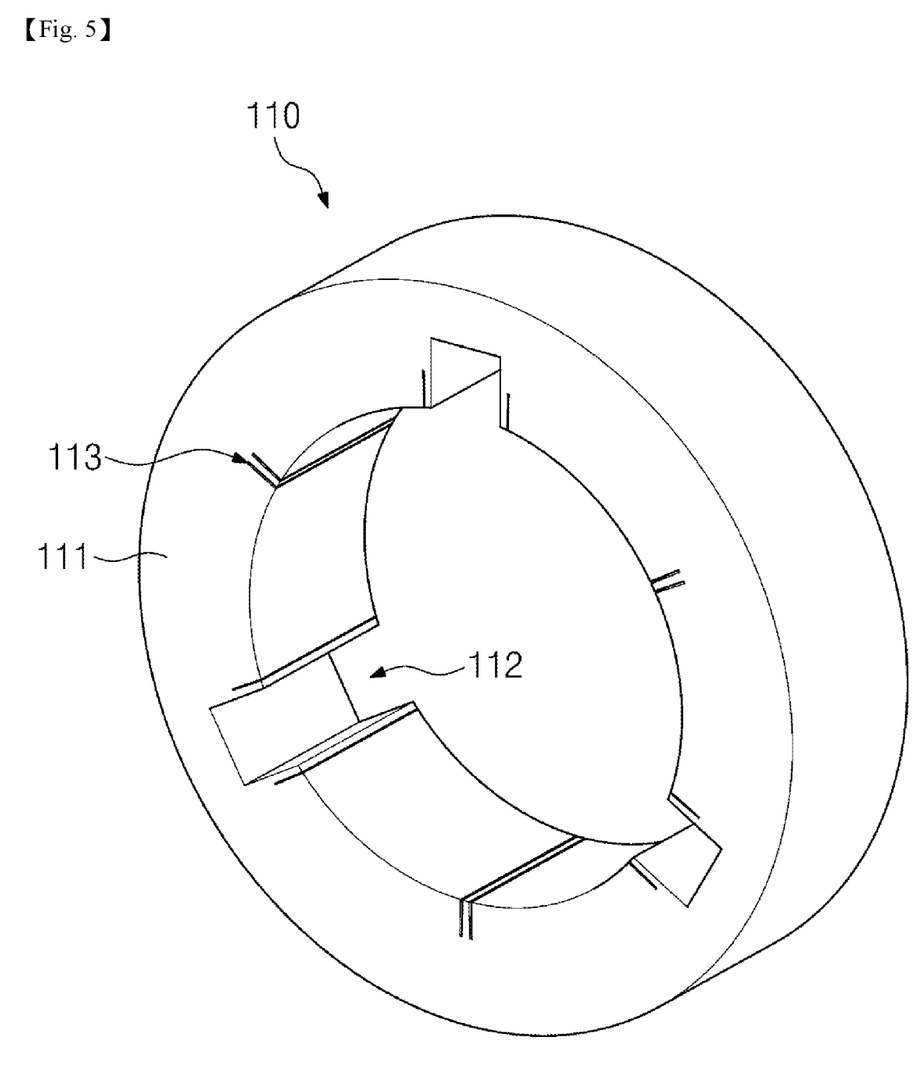
FIG. 5 is a perspective view showing a bearing housing of the floating-sleeve hybrid fluid bearing according to one embodiment of the present invention.
Figure 6:
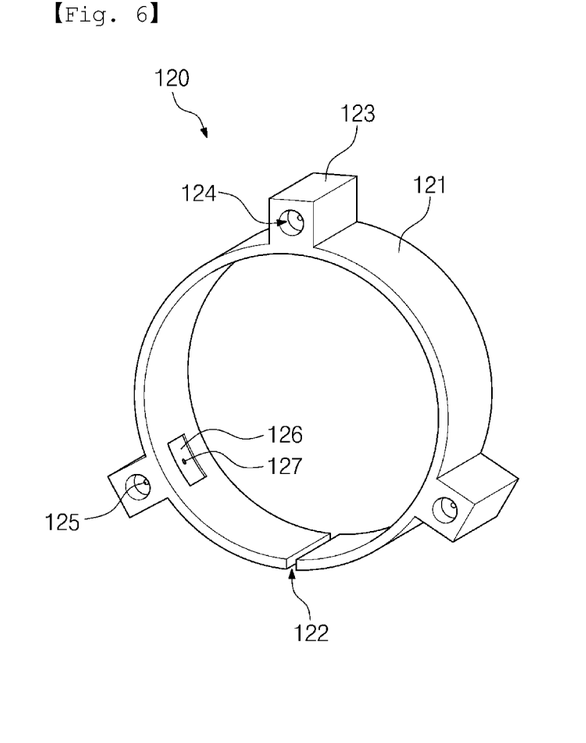
FIG. 6 is a perspective view showing a floating sleeve of the floating-sleeve hybrid fluid bearing according to one embodiment of the present invention.
Figure 7:
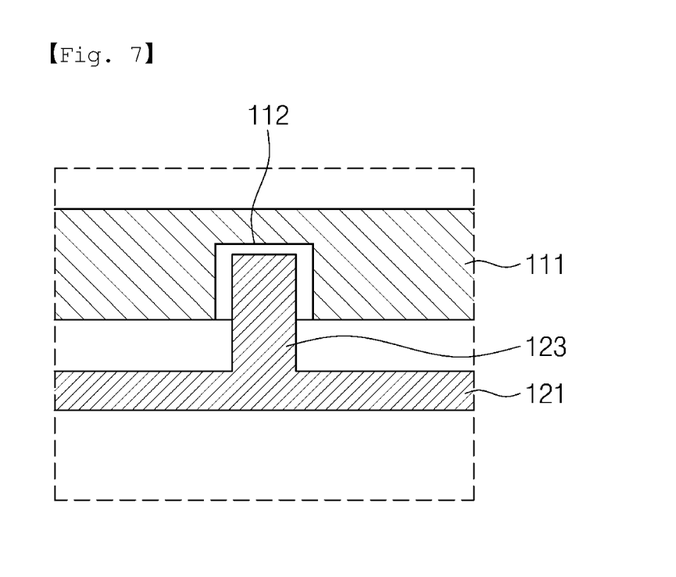
FIG. 7 is a schematic view showing a relative position of a protrusion accommodated in a guide groove when a rotary shaft is in a stationary state in the floating-sleeve hybrid fluid bearing according to one embodiment of the present invention.
Figure 8:
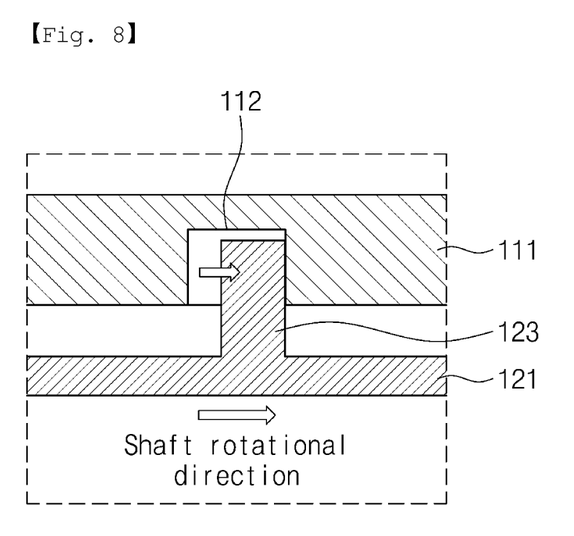
FIGS. 8 and 9 are schematic views showing relative position changes of the protrusion accommodated in the guide groove according to the rotational direction of the rotary shaft in the floating-sleeve hybrid fluid bearing according to one embodiment of the present invention.
Figure 9:
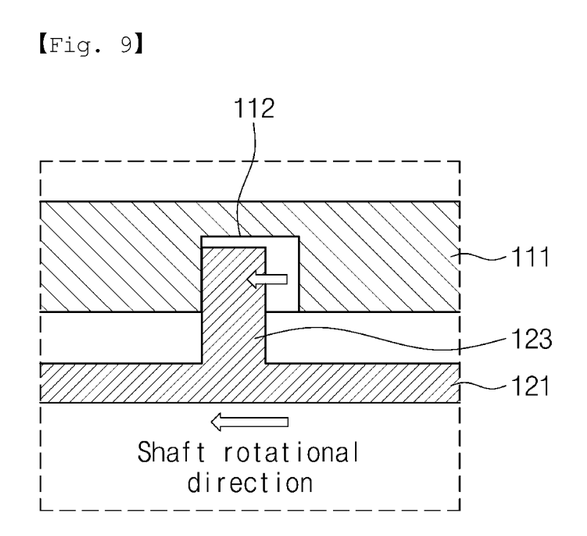
Figure 10:
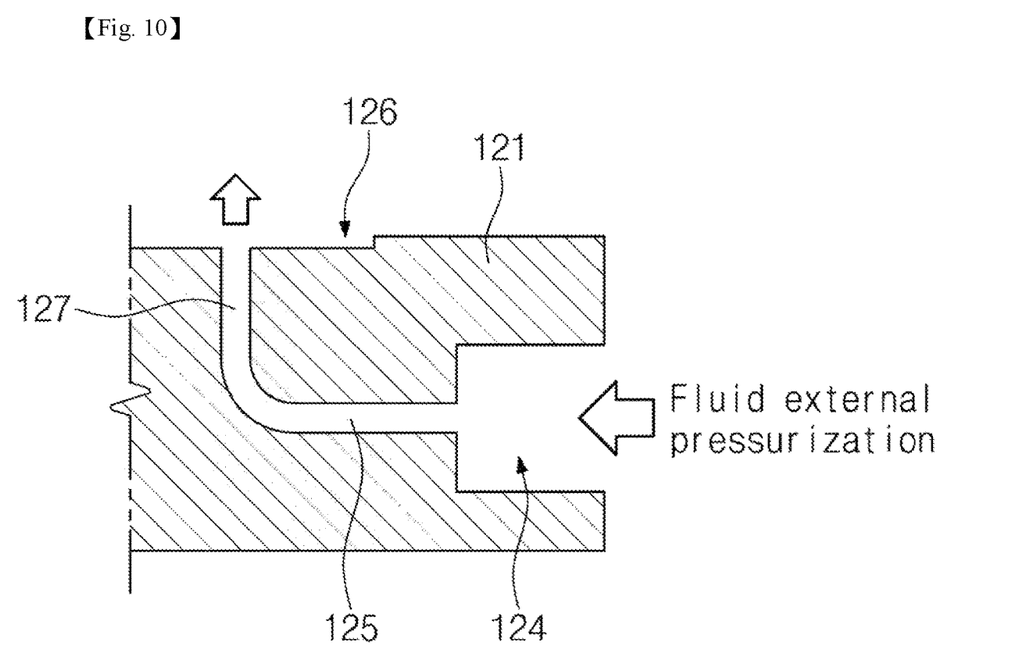
FIG. 10 is a schematic view for illustrating a fluid supply path of the floating sleeve in the floating-sleeve hybrid fluid bearing according to one embodiment of the present invention.

FIG. 1 is a perspective view showing a floating-sleeve hybrid fluid bearing according to one embodiment of the present invention. FIG. 2 is a plan view of FIG. 1. FIG. 3 is an incised sectional perspective view of FIG. 1. FIG. 4 is a schematic view showing the floating-sleeve hybrid fluid bearing according to one embodiment of the present invention. FIG. 5 is a perspective view showing a bearing housing of the floating-sleeve hybrid fluid bearing according to one embodiment of the present invention. FIG. 6 is a perspective view showing a floating sleeve of the floating-sleeve hybrid fluid bearing according to one embodiment of the present invention. FIG. 7 is a schematic view showing a relative position of a protrusion accommodated in a guide groove when a rotary shaft is in a stationary state in the floating-sleeve hybrid fluid bearing according to one embodiment of the present invention. FIGS. 8 and 9 are schematic views showing relative position changes of the protrusion accommodated in the guide groove in the floating-sleeve hybrid fluid bearing according to one embodiment of the present invention. FIG. 10 is a schematic view for illustrating a fluid supply path of the floating sleeve in the floating-sleeve hybrid fluid bearing according to one embodiment of the present invention.

As shown in FIGS. 1 to 4, a floating-sleeve hybrid fluid bearing 100 according to one embodiment of the present invention is a bearing that can be used as both of a hydrostatic bearing or a hydrodynamic bearing according to the rotational speed and the operating condition.

The floating-sleeve hybrid fluid bearing 100 according to one embodiment of the present invention may include a bearing housing 110 and a floating sleeve 120.

the bearing housing 110 may be mounted in a ring-coupled manner to an outer diameter surface of a rotary shaft S. The bearing housing 110 may be mounted on the outer diameter surface of the rotary shaft S via the floating sleeve 120. In other words, the bearing housing 110 may serve to protect the floating sleeve 120 from external environments.

Referring to FIG. 5, the bearing housing 110 may include a housing body 111 and a guide groove 112.

The housing body 111 defines an outer appearance of the bearing housing 110. The housing body 111 may have a center opened in an axial direction so that the rotary shaft S may be inserted thereto. For example, the housing body 111 may be provided in a hollow cylindrical or ring shape.

The guide groove 112 may be formed on an inner diameter surface of the housing body 111. The guide groove 112 may be formed in a depth direction from the inner diameter surface of the housing body 111. A plurality of guide grooves 112 may be formed on the inner diameter surface of the housing body 111. The guide grooves 112 may be spaced apart from each other in a circumferential direction on the inner diameter surface of the housing body 111.

A protrusion 123 of the floating sleeve 120 described later may be accommodated in the guide groove 112. Accordingly, the guide groove 112 may be formed in the same or similar shape to accommodate the protrusion 123 of the floating sleeve 120.

In one embodiment of the present invention, the guide groove 112 and the protrusion 123 of the floating sleeve 120 may be assembled very loosely (see FIG. 7). In other words, the guide groove 112 and the protrusion 123 of the floating sleeve 120 may have a clearance. This is configured such that the position of the floating sleeve 120 is determined freely according to dynamic and static load conditions and alignments, assembly conditions, thermal equilibrium conditions, and the like acting on the floating-sleeve hybrid fluid bearing 100 while the floating sleeve 120 is assembled to the bearing housing 110, and such that the floating sleeve 120 is prevented from being constrained by the bearing housing 110 when the floating sleeve 120 is expanded.

The guide groove 112 may variably come into contact with an outer side of the floating sleeve 120, more particularly, with the protrusion 123 of the floating sleeve 120 according to a rotational direction of the rotary shaft S, and accordingly, the rotation of the floating sleeve 120 may be constrained.

Meanwhile, the bearing housing 110 may further include a slot 113.

The slot 113 may be formed on an inner diameter surface of the housing body 111. The slot 113 may be formed in a depth direction from the inner diameter surface of the housing body 111. A plurality of slots 113 may be formed on the inner diameter surface of the housing body 111. The slots 113 may be spaced apart from each other in the circumferential direction on the inner diameter surface of the housing body 111. For example, the slots 113 may be spaced apart from each other in the circumferential direction on the inner diameter surface of the housing body 111 while being in pairs. In addition, the slots 113 may be formed on one side and the other side in the circumferential direction of the guide groove 112.

Figure 11:
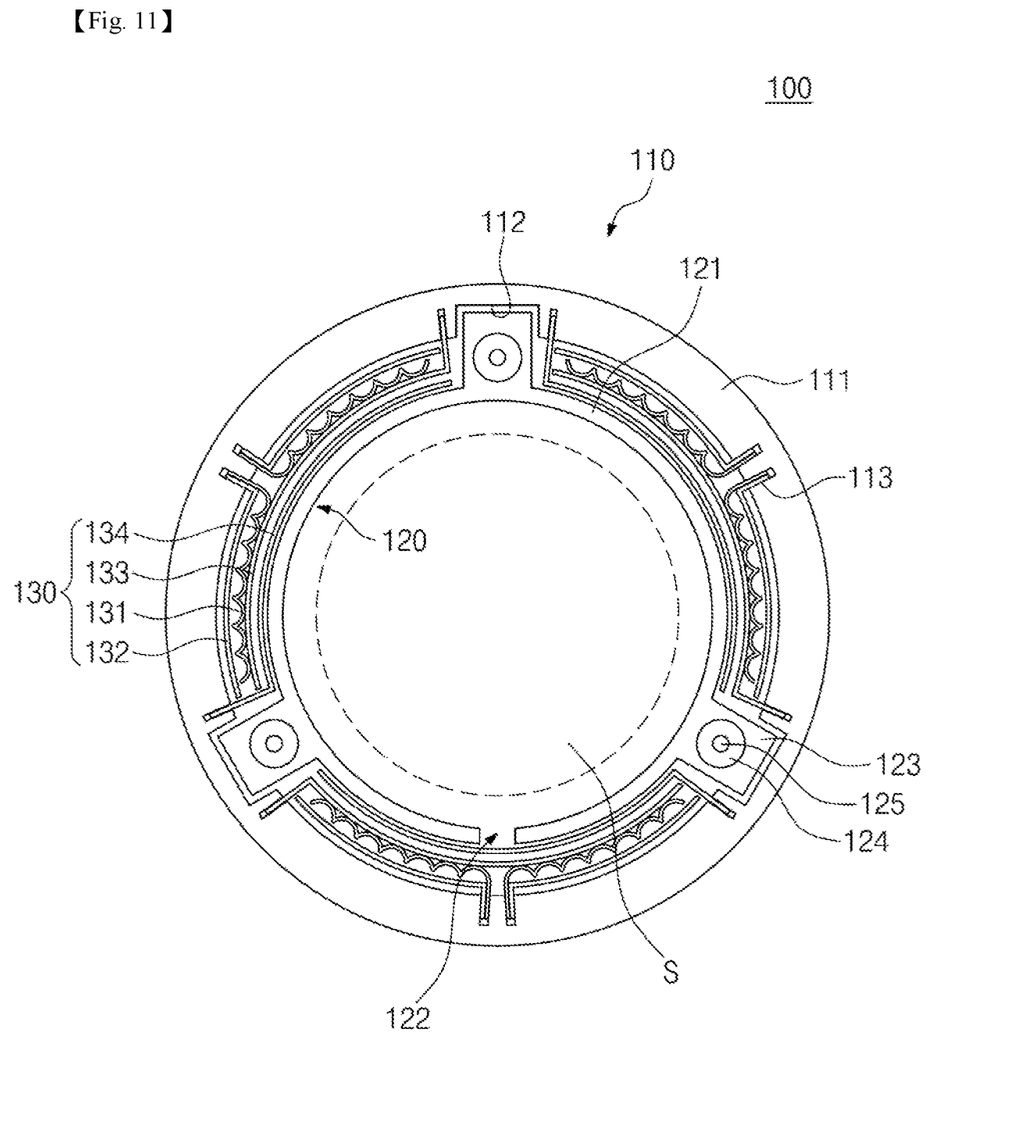
FIG. 11 is a schematic view showing the floating-sleeve hybrid fluid bearing according to another embodiment of the present invention.

The slot 113 serves to fix a compliant spring damper 130 as applied in FIG. 11.

The floating-sleeve hybrid fluid bearing 100 according to one embodiment of the present invention may further include a squeeze film damper. The squeeze film damper reduces vibration by adding damping to the bearing by the squeeze film damping effect occurring in an oil film under a fluid-lubricated state. The squeeze film damper according to one embodiment of the present invention may be provided in a gap between the bearing housing 110 and the floating sleeve 120.

The squeeze film damper may be provided as a fluid lubricating film F. The fluid lubricating film F may be provided as a single film or a multi-film in which two or more films are overlapped.

Accordingly, the squeeze film damper formed of the fluid lubricating film F is provided in the gap between the bearing housing 110 and the floating sleeve 120, so that the slot 113 formed on the inner diameter surface of the housing body 111 may be omitted.

Referring back to FIGS. 1 to 4, the floating sleeve 120 may be mounted between the rotary shaft S and the bearing housing 110. The floating sleeve 120 may have a gap between the floating sleeve and the rotary shaft S. In addition, the floating sleeve 120 may have a gap between the floating sleeve and the bearing housing 110.

In other words, the floating sleeve 120 may float between the rotary shaft S and the bearing housing 110. The floating sleeve 120 may supplied to the gap formed with the rotary shaft S and the gap formed with the bearing housing 110, so as to float freely between the rotary shaft S and the bearing housing 110 by the fluid lubricating film F acting as the squeeze film damper. The fluid may include any one of oil, air, gas, and cryogenic fluid.

The floating sleeve 120 according to one embodiment of the present invention may have rotation constrained by the bearing housing 110 when the rotary shaft S is rotated while freely floating between the rotary shaft S and the bearing housing 110.

In addition, the floating sleeve 120 according to one embodiment of the present invention may have a form in which one side is opened without being completely closed so as to be actively opened to prevent a damage when the fluid lubricating film F approaches the minimum oil film thickness under extreme operating conditions such as high load, high vibration, high temperature, and bearing-shaft misalignment. In other words, the floating sleeve 120 may have a structure capable of freely expanding within an elastic range of a material thereof.

Specifically, the floating sleeve 120 according to one embodiment of the present invention may have one side in the circumferential direction that is opened in the radial direction.

Accordingly, the floating-sleeve hybrid fluid bearing 100 according to one embodiment of the present invention may have the gap between the rotary shaft S and the floating sleeve 120 so as to be actively changed under extreme operating conditions such as high load, high vibration, high temperature, extremely low temperature, and bearing-shaft misalignment. Accordingly, the floating-sleeve hybrid fluid bearing 100 according to one embodiment of the present invention may avoid or delay pneumatic hammer instability, so that the stability of the bearing system can be remarkably improved, and the driving range thereof can be expanded.

Referring to FIG. 6, the floating sleeve 120 according to one embodiment of the present invention may include a sleeve body 121, an opening 122 and a protrusion 123.

The sleeve body 121 may have a center opened in an axial direction so that the rotary shaft S may be inserted thereto. In other words, the sleeve body 121 may be formed in a cylindrical or ring shape.

The sleeve body 121 may have an outer diameter smaller than an inner diameter of the housing body 111. Accordingly, the sleeve body 121 may be inserted into the inner diameter surface of the housing body 111.

In one embodiment of the present invention, the inner diameter surface of the sleeve body 121 may have a perfect circular shape. However, this is only an example, and the inner diameter surface of the sleeve body 121 may be formed in a lobe shape, an offset shape, or an elliptical shape in order to improve dynamic stability of the rotating body.

The opening 122 may be formed on one side of the sleeve body 121 in the circumferential direction. The opening 122 may be formed to communicate between the inside and the outside of the sleeve body 121 in the radial direction. Through the above opening 122, the floating sleeve 120 may have a form in which one side is opened without being completely closed, and may have the gap formed with the rotary shaft S so as to be actively changed to prevent breakage under extreme operating conditions such as high load, high vibration, high temperature, extremely low temperature, and bearing-shaft misalignment.

At least one protrusion 123 may be formed on the outer diameter surface of the sleeve body 121. The protrusion 123 may protrude radially outward from the outer diameter surface of the sleeve body 121.

When the bearing housing 110 and the floating sleeve 120 are assembled to each other, the protrusion 123 may be accommodated in the guide groove 112 provided in the bearing housing 110.

When the protrusion 123 is accommodated in the guide groove 112, the rotation of the floating sleeve 120 may be constrained even when the rotary shaft S is rotated.

The protrusion 123 according to one embodiment of the present invention may be provided as a hexahedron having a rectangular section. However, this is only an example, and the protrusion 123 may protrude from the outer diameter surface of the sleeve body 121 in various forms, such as a sphere or a hemisphere.

Referring to FIG. 7, in one embodiment of the present invention, when the protrusion 123 is accommodated in the guide groove 112 formed in the bearing housing 110 during assembling the bearing housing 110 with the floating sleeve 120, the inner surface of the guide groove 112 and the outer surface of the protrusion 123 may have a clearance therebetween.

Accordingly, the protrusion 123 may have a relative position changed within the guide groove 112 according to the rotational direction of the rotary shaft S.

Referring to FIG. 8, when the rotary shaft S is rotated in the right (clockwise) direction, the sleeve body 121 and the protrusion 123 of the floating sleeve 120 are also rotated in the same direction. At this point, the protrusion 123 is moved to the right within the guide groove 112, and comes into contact with a right inner wall surface of the fixed guide groove 112. In other words, the protrusion 123 is moved to the right from an initial position. The protrusion 123 is moved by a distance spaced apart from the right inner wall surface of the guide groove 112.

Accordingly, a further movement of the protrusion 123 is blocked. Thus, even when the rotary shaft S is rotated, the floating sleeve 120 may be maintained in a fixed state without rotation.

Referring to FIG. 9, likewise, when the rotary shaft S is rotated in the left (counterclockwise) direction, the sleeve body 121 and the protrusion 123 of the floating sleeve 120 are also rotated in the same direction. At this point, the protrusion 123 is moved to the left within the guide groove 112, and comes into contact with a left inner wall surface of the fixed guide groove 112. In other words, the protrusion 123 is moved to the left from the initial position. At this point, the protrusion 123 is moved by a distance spaced apart from the left inner wall surface of the guide groove 112.

Accordingly, a further movement of the protrusion 123 is blocked. Thus, even when the rotary shaft S is rotated, the floating sleeve 120 may be maintained in a fixed state without rotation.

In other words, the floating sleeve 120 according to one embodiment of the present invention may be maintained in a fixed state without interlocking therewith even when the rotary shaft S is rotated in the clockwise or counterclockwise direction through the accommodated protrusion 123 while having the clearance in the guide groove 112 provided in the bearing housing 110.

Referring to FIGS. 6 and 10, the floating sleeve 120 according to one embodiment of the present invention may further include a fitting mount hole 124, a flow path 125, a pocket 126, and an orifice 127.

The fitting mount hole 124 may be provided in the protrusion 123. Specifically, the fitting mount hole 124 may be provided on one side of the protrusion 123 in the axial direction. A fitting 10 (in FIG. 1) for connection with an external fluid supply device (not shown) may be mounted in the fitting mount hole 124.

The pocket 126 may be provided on the inner diameter surface of the sleeve body 121. The pocket 126 may be formed in the depth direction from the inner diameter surface of the sleeve body 121. The pocket 126 may be formed at a position corresponding to the protrusion 123. Accordingly, a plurality of the pockets 126 may be formed in the circumferential direction from the inner diameter surface of the sleeve body 121. As a result, the space between the floating sleeve 120 and the rotary shaft S may be smoothly lubricated by the fluid supplied in the circumferential direction of the outer diameter surface of the rotary shaft S.

The pocket 126 may have a rectangular shape in order to improve the load-bearing capacity, rigidity, and damping coefficient of the floating-sleeve hybrid fluid bearing 100. However, this is only an example, and the pocket 126 may have a shape of leaf, hexagon or ellipse.

Meanwhile, a part other than the pocket 126 in the inner diameter of the sleeve body 121 may have a shape of herringbone groove or spiral groove to improve load-bearing capacity.

Referring to FIG. 10, the flow path 125 may be formed to be connected inside the sleeve body 121 and the protrusion 123. The flow path 125 may be formed to communicate between the fitting mount hole 124 and the pocket 126, so that the fluid injected from the outside may be supplied to the pocket 126. In one embodiment of the present invention, the pocket 126 may be formed in the depth direction on the inner diameter surface of the sleeve body 121, and the fitting mount hole 124 may be formed on one side in the axial direction of the protrusion 123 provided on the outer diameter surface of the sleeve body 121, so that the flow path 125 may be formed in a structure in which one side in the longitudinal direction is bent.

The orifice 127 may be formed at an end of the flow path 125 positioned on the pocket 126 side. Accordingly, the fluid supplied to the floating sleeve 120 through the fitting 10 may be supplied to the pocket 126 through the flow path 125 and the orifice 127.

The floating-sleeve hybrid fluid bearing 100 according to one embodiment of the present invention may act as an external pressure bearing, that is, a hydrostatic bearing, when the fluid is continuously supplied to the pocket 126 through the fitting 10, the flow path 125 and the orifice 127. The external pressure bearing may prevent friction and wear on a bearing surface when driven initially and stopped, thereby increasing lifespan and durability of the bearing, and may be used in operating conditions in which bearing properties, such as high load, high rigidity, and high damping, are required.

However, when the rotary shaft S is stably rotated at high speed, that is, when it is unnecessary to be operated as the external pressure bearing the floating-sleeve hybrid fluid bearing 100 according to one embodiment of the present invention may also be operated as a hydrodynamic bearing by reducing or stopping the amount of fluid forcibly supplied to the pocket 126.

Meanwhile, when the flow path 125 and orifice 127, which are connected for external fluid supply, are processed, the protrusion 123 provides a wider processing utilization area compared to processing a relatively very thin circular sleeve. Accordingly, when the protrusion 123 is provided, the processing cost for the orifice 127 may be reduced, and the processing time may also be shortened.

In one embodiment of the present invention, the orifice 127 may be formed perpendicular to the rotary shaft S or the pocket 126. However, this is only an example, and the orifice 127 may be inclined at a predetermined angle to improve the dynamic stability of a rotating body.

Hereinafter, the floating-sleeve hybrid fluid bearing according to another embodiment of the present invention will be described with reference to FIG. 11.

FIG. 11 is a schematic view showing the floating-sleeve hybrid fluid bearing according to another embodiment of the present invention.

Referring to FIG. 11, the floating-sleeve hybrid fluid bearing 100 according to another embodiment of the present invention may include a bearing housing 110, a floating sleeve 120 and a compliant spring damper 130.

Another embodiment of the present invention since only has a difference in that the compliant spring damper is added compared with the one embodiment of the present invention, the remaining identical components may be assigned with the same reference numerals and detailed descriptions thereof will be omitted.

The compliant spring damper 130 has spring characteristics and friction damping characteristics at the same time. The compliant spring damper 130 may maintains the characteristics of the damper even under high-temperature conditions subject to the high-speed rotation of the rotary shaft S, so that a constant damping ability may be continuously maintained.

The compliant spring damper 130 may be provided in a gap between the bearing housing 110 and the floating sleeve 120. The compliant spring damper 130 according to another embodiment of the present invention may be provided as a bump foil 131. The bump foil 131 may be formed of one ply or one layer. However, this is only an example, and the bump foil 131 may also be provided as a double bump foil 131 formed of two plies or a multi-bump foil 131 formed of multiple plies, according to the damping characteristics, durability requirements, and the like required for the floating-sleeve hybrid fluid bearing 100.

The bump foil 131 may be provided in a gap between the bearing housing 110 and the floating sleeve 120 so as to be symmetrical right and left in the circumferential direction. Accordingly, even when the rotary shaft S is rotated in any direction, the same rigidity and damping may be given.

A plurality of the bump foils 131 may be provided at the gap defined by the bearing housing 110 and a plurality of floating sleeve 120 in the circumferential direction. One end the bump foil 131 in the longitudinal direction may be inserted and fixed in the slot 113 provided in the bearing housing 110.

Meanwhile, the compliant spring damper 130 according to another embodiment of the present invention may include a plurality of gap control foils 132, 133, and 134 for gap adjustment and preload application.

The gap control foils 132, 133 and 134 may be provided on both sides of the gap between the bearing housing 110 and the floating sleeve 120 in the width direction, that is, in the form of surrounding the bump foil 131 the longitudinal direction thereof.

Specifically, the first gap control foil 132 may be provided between the bump foil 131 and the bearing housing 110 in the longitudinal direction of the bump foil 131. In addition, the second gap control foil 133 may be provided between the bump foil 131 and the floating sleeve 120 in the longitudinal direction of the bump foil 131.

a third gap control foil 134 may be provided to be fixed in an opposite direction to the second gap control foil 133 between the bump foil 131 and the floating sleeve 120. Thus, the second gap control foil 133 and the third gap control foil 134 move in opposite directions to each other upon operation of the floating-sleeve hybrid fluid bearing 100, thereby generating a large frictional motion, so that the damping force may be increased.

In another embodiment of the present invention, each or at least one of one end of the first gap control foil 132, the second gap control foil 133 and the third gap control foil 134 in the longitudinal direction may also be inserted and fixed to the slots 113 provided in the bearing housing 110.

The floating-sleeve hybrid fluid bearing 100 according to another embodiment of the present invention may improve the dynamic stability of the bearing system by adding a hysteresis damping via the compliant spring damper 130. The floating-sleeve hybrid fluid bearing 100 according to another embodiment of the present invention may implement the bearing characteristics suitable for the needs of users by controlling the rigidity and damping of the compliant spring damper 130, and may also facilitate tuning of the characteristics.

Meanwhile, although the shape of the bump foil 131 is exemplified as the compliant spring damper 130 in another embodiment of the present invention, this is only an example, and a viscoelastic damper, an elastomer damper, a wave spring, a Marcel expander, a wire mesh damper, a coil spring, a tolerance ring, a cantilever beam foil, a wing foil and the like may be applied as the compliant spring damper 130.

Although the exemplary embodiments of the present invention have been described in detail, the scope of the present invention is not limited to a specific embodiment, and should be interpreted by the appended claims. In addition, it should be understood by those of ordinary skill in the art that various changes and modifications can be made without departing from the scope of the present invention.

The invention claimed is:

1. A floating-sleeve hybrid fluid bearing comprising:
   a bearing housing mounted on an outer diameter surface of a rotary shaft via a floating sleeve,
     wherein the floating sleeve is mounted between the rotary shaft and the bearing housing such that a first gap is formed between the rotary shaft and the bearing housing, and rotation of the floating sleeve is constrained by the bearing housing during the rotation of the rotary shaft, and
     wherein the floating sleeve includes two opposed circumferential ends that define an opening in the floating sleeve; and
   a squeeze film damper provided in a second gap between the bearing housing and the floating sleeve, wherein the squeeze film damper is provided as a fluid lubricating layer having at least one layer.

2. The floating-sleeve hybrid fluid bearing of claim 1, wherein the bearing housing includes:
   a housing body having a center opened in an axial direction to allow the rotary shaft to be inserted; and
   at least one guide groove formed on an inner diameter surface of the housing body and extending in a depth direction from the inner diameter surface of the housing body, and variably coming into contact with an outer side of the floating sleeve according to a rotational direction of the rotary shaft.

3. The floating-sleeve hybrid fluid bearing of claim 2, wherein the floating sleeve further includes:
   a sleeve body having a center opened in the axial direction to allow the rotary shaft to be inserted, and having an outer diameter smaller than an inner diameter of the housing body, wherein the opening is formed to communicate between an inside and an outside of the sleeve body in a radial direction; and
   at least one protrusion formed on the outer diameter surface of the sleeve body, protruding radially outward from the outer diameter surface of the sleeve body, and accommodated in the at least one guide groove.

4. The floating-sleeve hybrid fluid bearing of claim 3, wherein an inner surface of the at least one guide groove and an outer surface of the at least one protrusion have a clearance therebetween, and the at least one protrusion has a relative position changed within the at least one guide groove according to the rotational direction of the rotary shaft.

5. A floating-sleeve hybrid fluid bearing comprising:
   a bearing housing mounted on an outer diameter surface of a rotary shaft via a floating sleeve,
     wherein the floating sleeve is mounted between the rotary shaft and the bearing housing such that a first gap is formed between the rotary shaft and the bearing housing, and rotation of the floating sleeve is constrained by the bearing housing during the rotation of the rotary shaft, and
     wherein the floating sleeve includes two opposed circumferential ends that define an opening in the floating sleeve,
   wherein the bearing housing includes:
     a housing body having a center opened in an axial direction to allow the rotary shaft to be inserted; and
     at least one guide groove formed on an inner diameter surface of the housing body and extending in a depth direction from the inner diameter surface of the housing body, and variably coming into contact with an outer side of the floating sleeve according to a rotational direction of the rotary shaft,
   wherein the floating sleeve further includes:
     a sleeve body having a center opened in the axial direction to allow the rotary shaft to be inserted, and having an outer diameter smaller than an inner diameter of the housing body, wherein the opening is formed to communicate between an inside and an outside of the sleeve body in a radial direction; and
     at least one protrusion formed on the outer diameter surface of the sleeve body, protruding radially outward from the outer diameter surface of the sleeve body, and accommodated in the at least one guide groove, and
   wherein the floating sleeve further includes:
     a pocket formed in the depth direction, at a position corresponding to the at least one protrusion, in an inner diameter surface of the sleeve body;
     a fitting mount hole provided on one side in the axial direction of the at least one protrusion, and mounted therein with a fitting for connection with an external fluid supply device;
     a flow path formed inside the sleeve body and the at least one protrusion to communicate the fitting mount hole with the pocket; and
     an orifice formed at an end of the flow path positioned on the pocket.

6. The floating-sleeve hybrid fluid bearing of claim 5, wherein the orifice is perpendicular or inclined with respect to the rotary shaft.

7. The floating-sleeve hybrid fluid bearing of claim 5, further comprising a compliant spring damper, wherein the compliant spring damper is provided in a second gap between the bearing housing and the floating sleeve, and provided as a bump foil having at least one ply.

8. The floating-sleeve hybrid fluid bearing claim 7, wherein the compliant spring damper includes foil a plurality of gap control foils provided along a longitudinal direction of the bump foil on both sides of the second gap between the bearing housing and the floating sleeve, and wherein the gap control foil plurality of gap control foils surrounds surround the bump foil in the longitudinal direction.

9. The floating-sleeve hybrid fluid bearing claim 8, wherein the bearing housing further includes at least one slot formed on the inner diameter surface of the housing body, in the depth direction from the inner diameter surface of the housing body, and one end of the bump foil or the plurality of gap control foils are inserted thereto.

* * * * *